March 5, 1940.     I. NEWMAN     2,192,503
WORK FEEDING DEVICE
Original Filed Nov. 30, 1937
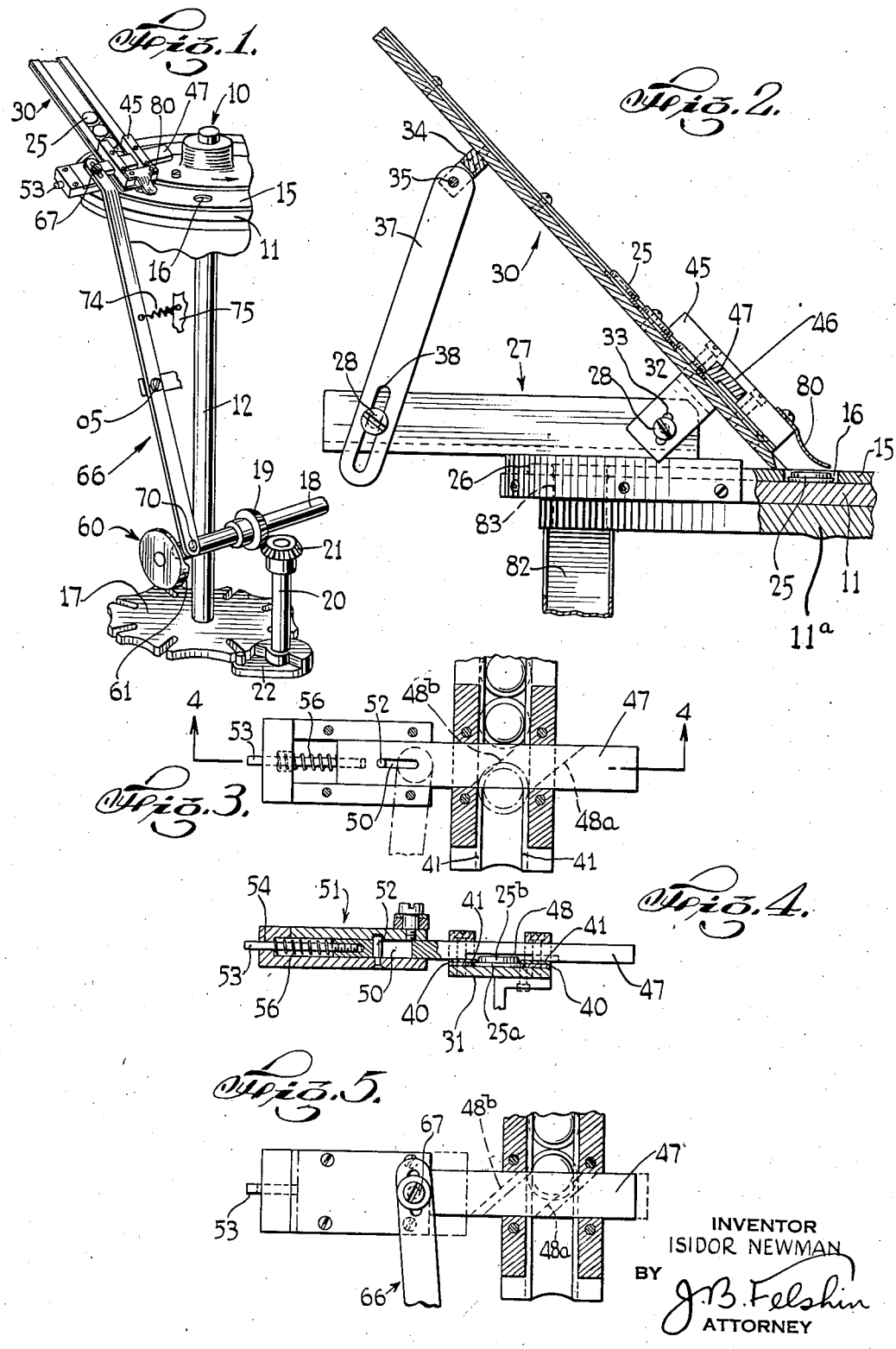
INVENTOR
ISIDOR NEWMAN
BY
J. B. Felshin
ATTORNEY Patented Mar. 5, 1940

2,192,503

UNITED STATES PATENT OFFICE 2,192,503

WORK FEEDING DEVICE

Isidor Newman, New York, N. Y.

Original application November 30, 1937, Serial No. 177,343, now Patent No. 2,179,755, dated November 14, 1939. Divided and this application December 31, 1938, Serial No. 248,741

10 Claims. (Cl. 198—26)

This invention relates to mechanism for intermittently feeding work to an intermittently moving member. It is particularly directed to mechanism for feeding caps to a rotating turret of metal scoring machinery, such as described in my Patent No. 2,179,755, granted November 14, 1939, on co-pending application Serial No. 177,343, filed November 30, 1937, of which application this application is a division.

An object of this invention is to provide in mechanism of the character described a chute, and a reciprocating transverse bar thereon, constructed to permit passage of pieces of stock down the chute and past the bar one at a time as the bar reciprocates, and improved means to reciprocate the bar including a yielding connection between the reciprocating means and the bar, permitting the reciprocating means to continue operation without breaking, should the bar become jammed.

A further object of this invention is to provide a rotating turret having equiangularly spaced openings to receive the work, means for rotating the turret, and means operating in synchronism with the turret, to feed articles one at a time to each of the openings as the turret rotates.

Yet another object of this invention is to provide a strong, rugged and durable machine of the character described, which shall be inexpensive to manufacture, positive in operation, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible illustrative embodiments of this invention.

Fig. 1 is a perspective view of a machine, embodying the invention;

Fig. 2 is a cross-sectional view through the work feeding chute;

Fig. 3 is a partial, front, elevational view of the feeding mechanism with parts in cross-section, showing said mechanism in position directly after ejecting an article to the turret;

Fig. 4 is a cross-sectional view taken on line 4—4 of Fig. 3; and

Fig. 5 is a view similar to Fig. 3, but showing the position of the parts when the bar is stuck and cannot move.

Referring now in detail to the drawing, 10 designates a machine, embodying the invention. This machine may be part of metal scoring machine, such as is disclosed in my Patent No. 2,179,755.

The machine 10 comprises a fixed circular plate 11 mounted on frame wall 11a, and formed with a central vertical opening in which is journalled the upper end of vertical shaft 12, projecting above said plate. Fixed to the projecting portion of said shaft, is a turret plate 15 formed with a plurality of equiangularly spaced circular openings 16.

Means is provided to intermittently rotate the turret plate 15 at regular intervals through angles equal to the angles between the openings 16. To this end, the turret shaft 12 carries at its lower end a Geneva gear wheel 17. Supported for rotation in any suitable manner on the frame of the machine, is a horizontal shaft 18 connected to any suitable drive. Shaft 18 carries a bevel gear 19, for the purpose hereinafter appearing.

The frame of the machine 10 also rotatably supports, in any suitable manner, a vertical shaft 20 provided with a beveled gear 21 at its upper end meshing with the gear 19. At the lower end of shaft 20 is a Geneva gear pawl 22 adapted to cooperate with the Geneva gear wheel 17 for intermittently rotating said wheel at regular intervals through predetermined angles. The Geneva gear wheel 17 has as many radial slots as there are openings 16 in the turret plate 15.

Means is provided for feeding articles 25, such as caps or the like articles, to the openings 16 as the turret plate is intermittently rotated. To this end, there is fixed to the edge of plate 11 a curved bar 26, carrying a horizontal angle shaped bar 27. Screwed to the vertical wall of said angle shaped bar 27 are a pair of spaced headed screws 28.

Supported by member 27, in the manner hereinafter explained, is a chute 30. The chute 30 may comprise a flat plate 31, to the lower end of the underside of which, there is attached an angle shaped bracket 32 formed with a slot 33 to receive one of the screws 28. Fixed to the upper end of the underside of the plate 31, is a slotted member 34 provided with a transverse pin 35. Pivoted to the pin 35 is the upper end of a bar 37, the latter being formed with a longitudinal slot 38, adjacent its lower end, receiving the other screw 28.

It will be noted that the chute 30 is inclined upwardly and the angle of the chute may be adjusted by loosening the screws 28, moving the chute to the desired angle, and then tightening said screws.

The lower end of the chute is preferably just above the turret plate 15 and just rearwardly of one of the openings 16. Fixed to the upper surface of the plate 31, and adjacent the side edges thereof, are narrow strips 40; and fixed to the narrow strips 40 are wider strips 41, the inner edges whereof are closer together than the inner edges of the strips 40, whereby to produce a pair of inner grooves to receive the brims 25a of the caps 25. The crowns 25b of said caps project upwardly between and above the strips 41, for the purpose hereinafter appearing. Caps may be placed in the upper end of the chute so as to slide down the chute by gravity.

Attached to the strips 41, adjacent the lower end of the chute, are a pair of parallel longitudinal bars 45. The bars 45 are formed with aligned grooves or openings 46 on the undersides thereof. Slidably mounted in the openings 46 is a transverse bar 47, formed on the undersurface thereof with an inclined groove 48 of uniform depth sufficient to receive the portions of the crown 25b of the caps 25 which project above the strips 41. Said groove 48 has parallel upwardly inclined edges 48a, 48b.

The bar 47 is formed with a longitudinal slot 50 adjacent one end. Slidably receiving said end of said bar is a sheath or housing 51, provided with a transverse pin 52, extending through the slot 50. Screwed to said end of the bar 47 is a longitudinal pin 53 passing through an opening 54 at the closed end of the sheath 51. A compression spring 56 disposed within the sheath, surrounds the pin 53, and is interposed between one end of the bar 47, and the closed end of the sheath.

Means is provided for reciprocating the bar 47 intermittently in synchronism with the rotation of the turret plate 15, to intermittently feed the caps 25 at regular intervals to the openings 16 in the turret plate. To this end, shaft 18 carries an angular disc cam 60, having a cammed or humped portion 61 on the inner surface thereof.

Pivoted to a fixed fulcrum 65 on the frame of machine 10, is a lever 66 having at the upper end thereof, a pin and slot connection 67 with the housing or sheath 51. At the lower end of the lever 66, is a pin or roller 70, engaging the cammed surface of the disc 60. A coil tension spring 74 interconnects the upper end of the lever 66 to a fixed anchor 75 on the frame of the machine 10, to maintain the roller 70 in engagement with the cammed disc 60.

The operation of the feeding mechanism will now be described:

The caps 25 are fed at the upper end of the chute and slide down the chute until they contact the transverse bar 47. Upon rotation of the shaft 18, lever 66 will be caused to oscillate at regular intervals, due to engagement of the roller 70 with the high portion 61 of the disc, in synchronism with the intermittent rotation of the turret plate 15. Oscillation of the lever 66 will cause reciprocation of the sheath 51, for reciprocating the bar 47.

As shown in Fig. 3 of the drawing, the crown of one cap 25 contacts the upper edge of bar 47. Upon moving said bar to the left, to the position shown in Fig. 5, the lowermost cap will drop down into groove 48, the crown 25b of the cap contacting the inclined edge 48a of said groove.

When the lever, thereafter, oscillates in the opposite direction or to the right, looking at the drawing, the other inclined edge 48b of the groove will engage the crown of the cap while the cap moves downwardly through the groove 48, to push the cap downwardly, below the bar 47. The cap may then drop to the lower end of the chute, and as it drops to the lower end of the chute it will enter an opening 16 in the turret plate, which will at that time be directly below the lower end of the chute.

The cam 60 is so placed on the shaft 18 that as the bar 47 pushes a cap down, the turret plate is stationary, and when the bar 47 is retracted to the left, the turret plate rotates to bring the next opening 16 to a position at the lower end of the chute.

Fixed to the lower ends of the bars 45, is a transverse spring finger 80 to prevent the caps from jumping out of the openings 16.

Should a cap get stuck in the groove 48, so that the bar 47 is jammed, the sheath 51 may move relative to the bar, compressing the spring 56, and thus, preventing the feeding mechanism from breaking. The bar will be pulled to the left if it is not in such position, and will remain there as lever 66 oscillates.

As the turret plate rotates, the caps may be carried to a position where further work may be done thereon, and after the caps are worked on, they may be further rotated by the turret plate to a delivery chute 82, aligned with an opening 83 in the plate 11.

Although the drawing discloses feeding means for feeding caps to the turret plate, it will be understood that other pieces of stock, or articles such as can tops and the like articles may be fed intermittently to the turret plate.

Should a cap become jammed in the position shown in Fig. 5 of the drawing, it will hold the bar 47 from further movement to the right, permitting the lever 66 to make a complete oscillation, and also oscillating the cover or sheath 51 (if spring 74 has sufficient tension to compress spring 56) without moving the bar 47. Upon completion of the oscillation, the bar 47 is retracted sufficiently to permit the jammed cap to pass through the groove 48.

It will now be understood that with the improved feeding mechanism all that happens when a cap becomes jammed in the position shown in Fig. 5, is that there is a miss in the feeding operation to one of the openings 16 in the turret plate. On the next oscillation, the next opening 16 receives a cap. A cap thus holds the bar 47 without being mutilated or damaged, and moves past the bar on the next oscillation.

It will also be understood that the cammed disc 60 and spring 74 may be replaced by a peripherally grooved circular cam, receiving member 70 to positively oscillate the lever 66 in opposite directions.

I do not restrict myself to the details of the chute, as the chute may be constructed of one piece of metal instead of employing the strips 40 and 41.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Instead of the slot 50 being in the bar 47 and the pin 52 on the cover 51, the cover may be provided with a longitudinal slot, and the bar with a pin slidably received in said slot. In such event, the pin is normally at the right end of the slot.

Having thus described my invention, I claim as new and desire to secure by Letters Patent:

1. In combination, a chute, a bar mounted thereon for transverse reciprocation, and formed with an inclined passage adapted to permit articles in the chute to move down past the bar and through said passage, one at a time, as said bar is reciprocated, a member slidably mounted on said bar and connected thereto by a lost motion connection, a spring interposed between said bar and member, and means for reciprocating said member.

2. In combination, a rotary turret plate having a plurality of equiangularly spaced openings, means to intermittently rotate said turret plate at regular intervals, step by step, through angles equal to the angles between said openings, a chute above said plate adapted to receive pieces of stock, the lower end of said chute being disposed adjacent said plate, a bar mounted on said chute for transverse reciprocation thereon, and being formed with an inclined groove on the underside thereof adapted to permit the pieces of stock to move down the chute, past the bar one at a time as the bar is reciprocated, a member slidably mounted on said bar and having a lost motion connection therewith, a spring interposed between said bar and member, and means synchronized with the intermittently rotating means, for reciprocating said member.

3. In combination, an inclined chute, a transverse bar slidably mounted on said chute, and having an inclined groove on the side thereof, adjacent said chute, said bar being formed with a longitudinal slot, a sheath slidably mounted on one end of said bar and provided with a pin passing through said slot, a coil compression spring interposed between said end of said bar and said sheath, and means for reciprocating said sheath.

4. In combination, an inclined chute having spaced parallel portions on its upper side forming opposed grooves to receive portions of articles placed on said chute, and to permit other portions of said articles to project between and above said parallel portions of said chute, a transverse bar slidably mounted on said chute, the portions of said articles which project above said parallel portions of said chute, being adapted to contact the upper edge of said transverse bar, said transverse bar being formed on its undersurface with an inclined groove of uniform depth, adapted to permit said articles to pass down the chute, and past the bar, one at a time as said bar is reciprocated, a member slidably mounted on said bar, and having a pin and slot connection thereto, a spring interposed between the bar and said member, and means for reciprocating said member.

5. In combination, an inclined chute having spaced parallel portions on its upper side forming opposed grooves to receive portions of articles placed on said chute, and to permit other portions of said articles to project between and above said parallel portions of said chute, a pair of parallel bars fixed to said parallel portions and formed with aligned cut-away portions, a transverse bar slidably mounted in said cut-away portions, the portions of said articles which project above said parallel portions of said chute being adapted to contact the upper edge of said transverse bar, said transverse bar being formed on its undersurface with an inclined groove of uniform depth adapted to permit said articles to pass down the chute and past said transverse bar one at a time as the latter is reciprocated, a sheath slidably mounted on said transverse bar and receiving one end thereof, and having an end wall at one end, said transverse bar being formed with a longitudinal slot, a pin on said sheath slidably received within said slot, a pin fixed on one end of said transverse bar and passing through an opening in said end wall, a spring received on said last mentioned pin and interposed between one end of said transverse bar and said end wall, and means for reciprocating said sheath.

6. In combination, an inclined chute having spaced parallel portions on its upper side forming opposed grooves to receive portions of articles placed on said chute, and to permit other portions of said articles to project between and above said parallel portions of said chute, a pair of parallel bars fixed to said parallel portions and formed with aligned cut-away portions, a transverse bar slidably mounted in said cut-away portions, the portions of said articles which project above said parallel portions of said chute being adapted to contact the upper edge of said transverse bar, said transverse bar being formed on its undersurface with an inclined groove of uniform depth adapted to permit said articles to pass down the chute and past said transverse bar one at a time as the latter is reciprocated, a sheath slidably mounted on said transverse bar and receiving one end thereof, and having an end wall at one end, said transverse bar being formed with a longitudinal slot, a pin on said sheath slidably received within said slot, a pin fixed on one end of said transverse bar and passing through an opening in said end wall, a spring received on said last mentioned pin and interposed between one end of said transverse bar and said end wall, means for reciprocating said sheath, said means comprising a rotary shaft, a cammed disc on said rotary shaft, a lever pivoted mediately the ends thereof to a fixed fulcrum, a member on said lever engaging said cammed disc, said lever having a pin and slot connection with said sheath, and a spring fixed at one end to said lever and connected to a fixed anchor at its other end.

7. In combination, a rotary turret plate having a plurality of equiangularly spaced openings, an axial shaft fixed to said turret plate, means for intermittently rotating said shaft through angles equal to the angles between said openings, a chute above said turret plate adapted to receive pieces of stock, the lower end of said chute being disposed adjacent said plate, a bar mounted on said chute for transverse reciprocation thereon, and being formed with an inclined groove of uniform depth on the underside thereof, adapted to permit the pieces of stock to move down the chute, past said bar one at a time as said bar is reciprocated, and means synchronized with the intermittently rotating means for reciprocating said bar.

8. In combination, a chute, a bar slidably mounted thereon for transverse reciprocation and adapted to permit articles in the chute to move down the chute, past the bar one at a time as the bar is reciprocated, a member slidably mounted on said bar and connected thereto by a lost motion connection, a spring interposed between said bar and member whereby when said member is moved in one direction, said bar will be yieldingly moved by said spring in said direction, a lever pivoted to a fixed fulcrum mediately the ends thereof, one end of said lever having a connection with said member, a spring connected at one end to said lever and to a fixed anchor at its other end, and adapted to rotate said lever for moving said member in said direction, and means for intermittently rotating said lever to move said member in an opposite direction.

9. In combination, a chute, a member on the chute movable transversely thereof in opposite directions and adapted to be contacted by articles passing down the chute, said member being provided with a cut-away passage inclined upwardly and to one side, to permit the articles to pass down the chute through said passage and past said member, one at a time, each time said member is moved to said side a member having a lost motion connection to said first member and connected thereto by a spring, said spring being adapted to yieldingly move said first member toward said side when said second member is moved toward said side, spring means to move said second member toward said side, and means for intermittently moving said second member toward the opposite side.

10. In combination, a chute, a member on the chute movable transversely thereof in opposite directions and adapted to be contacted by articles passing down the chute, said member being provided with a cut-away portion to permit the articles to pass down the chute and past said member, one at a time, as said member is moved back and forth on said chute, a member movable with respect to said first member, and connected thereto by spring means, adapted to yieldingly move said first member in one direction when said second member is moved in said direction, spring means for moving said second member in said direction, and means for moving said second member in an opposite direction against said spring means, at regular intervals.

ISIDOR NEWMAN.